US006979278B2

(12) United States Patent
Rick et al.

(10) Patent No.: US 6,979,278 B2
(45) Date of Patent: Dec. 27, 2005

(54) HAND LEVER WITH INTEGRATED CONTROLLER

(75) Inventors: Sean E. Rick, Schnecksville, PA (US); Gary B. Swetish, Racine, WI (US); Alan Simchayoff, Warrington, PA (US)

(73) Assignee: General Signal Technology Corporation, Charlotte, NC (US)

( * ) Notice: Subject to any disclaimer, the term of this patent is extended or adjusted under 35 U.S.C. 154(b) by 12 days.

(21) Appl. No.: 10/694,410

(22) Filed: Oct. 27, 2003

(65) Prior Publication Data

US 2005/0090368 A1 Apr. 28, 2005

(51) Int. Cl.[7] ............................................. F16H 59/64
(52) U.S. Cl. ....................... 477/98; 74/473.12; 477/111
(58) Field of Search ........................ 477/111, 112, 113, 477/165; 74/473–12, 480 B; 200/61–88; 180/333; 440/87, 84

(56) References Cited

U.S. PATENT DOCUMENTS 5,062,516 A * 11/1991 Prince ......................... 477/98
5,315,900 A * 5/1994 Teeter ........................ 477/165
5,566,586 A * 10/1996 Lauer et al. .................. 74/523
5,657,001 A * 8/1997 Wilson .................... 74/473.12

* cited by examiner

*Primary Examiner*—Dirk Wright
(74) *Attorney, Agent, or Firm*—Baker & Hostetler LLP

(57) ABSTRACT

The invention provides hand levers having integrated controllers. A hand lever according to the invention may include a housing and a horn controller that is adapted to be electrically connected to a horn. The horn controller, which may include a horn button, is coupled to the housing and is accessible from the exterior of the housing. The controller may also be a speed controller for controlling speed or cruise control. The hand lever is adapted to control at least one of transmission shift position and engine throttle.

22 Claims, 6 Drawing Sheets

HAND LEVER WITH INTEGRATED CONTROLLER

FIELD OF THE INVENTION

Generally, the invention relates to hand levers such as those that might be used for control of marine vessels. More particularly, the invention relates to such hand levers where a controller is integrated into the hand lever.

BACKGROUND OF THE INVENTION

Marine vessels typically include one or more hand levers via which an operator of the vessel can control the vessel's engine/transmission pairs (i.e., power trains). It is common for a separate hand lever to be provided for each power train, though a single hand lever may control more than one power train and separate hand levers may be provided for each of shift control and throttle control.

A marine vessel may have any number of helms, or control stations, from which an operator may control the vessel. Each helm typically has a steering mechanism, such as a steering wheel, for controlling the direction in which the vessel moves, and a control unit for controlling shift position and/or throttle. FIG. 1 depicts a typical prior art single top mount control unit 10 for controlling a marine vessel. The control unit 10 includes a housing 12 and a hand lever 20. The hand lever 20 controls the throttle of an associated engine (not shown) and the shift position of an associated transmission (not shown). The hand lever 20 may be rotationally coupled to the housing 12 via a rotational coupling mechanism 26, and may include a hand lever knob 22 and a handle 24.

The hand lever 20 can be moved through an operational range from reverse wide open throttle to forward wide open throttle. By moving the hand lever 20 along its operational range, an operator can control the shift position of the associated transmission and the throttle of the associated engine. The control unit 10 may include a shift status indicator 14 that indicates the current shift and throttle position of the hand lever 20.

Such vessels also typically include electrically controlled horns. For this purpose, a horn controller is provided to enable the operator to sound the horn. Typically, such a horn controller includes a button mounted on the housing of the control unit or elsewhere at the helm.

In known systems, the horn button is located away from the hand lever, which causes the operator of the vessel to have to remove his hand from either the hand lever or the steering wheel in order to sound the horn. This is undesirable because, in situations where the operator needs to sound the horn, the operator usually wants to be able to steer the vessel and control its shift and throttle. Also, the operator typically has to take his eye off the "road" in order to locate the horn button to sound the horn. The time it takes for the operator to locate to the horn button may be amplified on vessels having more than one control station because the horn buttons may be in different locations at different stations and the operator may not remember immediately where the horn button is located at the station from which he is currently operating the vessel. Again, in a situation in which the operator needs to sound the horn, he probably does not want to take his eye off the "road." Thus, systems in which the horn controller is located away from the hand lever may be dangerous.

Therefore, it would be advantageous to operators of such vessels if the operator could control the vessel's horn without having to remove a hand from either the hand lever or steering wheel and without having to take his eyes off the "road."

SUMMARY OF THE INVENTION

The invention provides hand levers having integrated controllers. A hand lever according to the invention may include a housing and a horn controller that is adapted to be electrically connected to a horn. The horn controller, which may include a horn button, is coupled to the housing and is accessible from the exterior of the housing. The hand lever is adapted to control at least one of transmission shift position and engine throttle.

The horn controller may include electrically conductive wiring that adapts the horn controller to be electrically connected to the horn. Such wiring may extend through the interior of the housing. For example, the wiring may extend through a wire tunnel in the interior of the housing. The hand lever may include a hub shaft for rotationally coupling the hand lever to a hand lever support. In such an embodiment, the wiring may be coiled around the hub shaft.

The housing may have a distal end having an overall shape that enables the distal end to be received in the palm of a human hand. The horn controller may be coupled to the housing such that the horn controller is within reach of the thumb of the human hand while the distal end of the housing is received in the palm. Thus, a user of the hand lever may operate the horn without having to remove his hand from the hand lever.

Alternatively or additionally, a speed controller may be integrated into the hand lever. Such a speed controller may be electrically coupled to an electronic engine, for example, and may be used to provide speed or cruise control by controlling engine speed.

A control assembly according to the invention includes such a hand lever rotationally coupled to a control head. The control assembly may be a top mount control assembly or a side mount control assembly. In either top or side mount configuration, the hand lever may be mounted on either the port or starboard side of the control assembly.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings.

DETAILED DESCRIPTION OF ILLUSTRATIVE EMBODIMENTS

Figure 1:
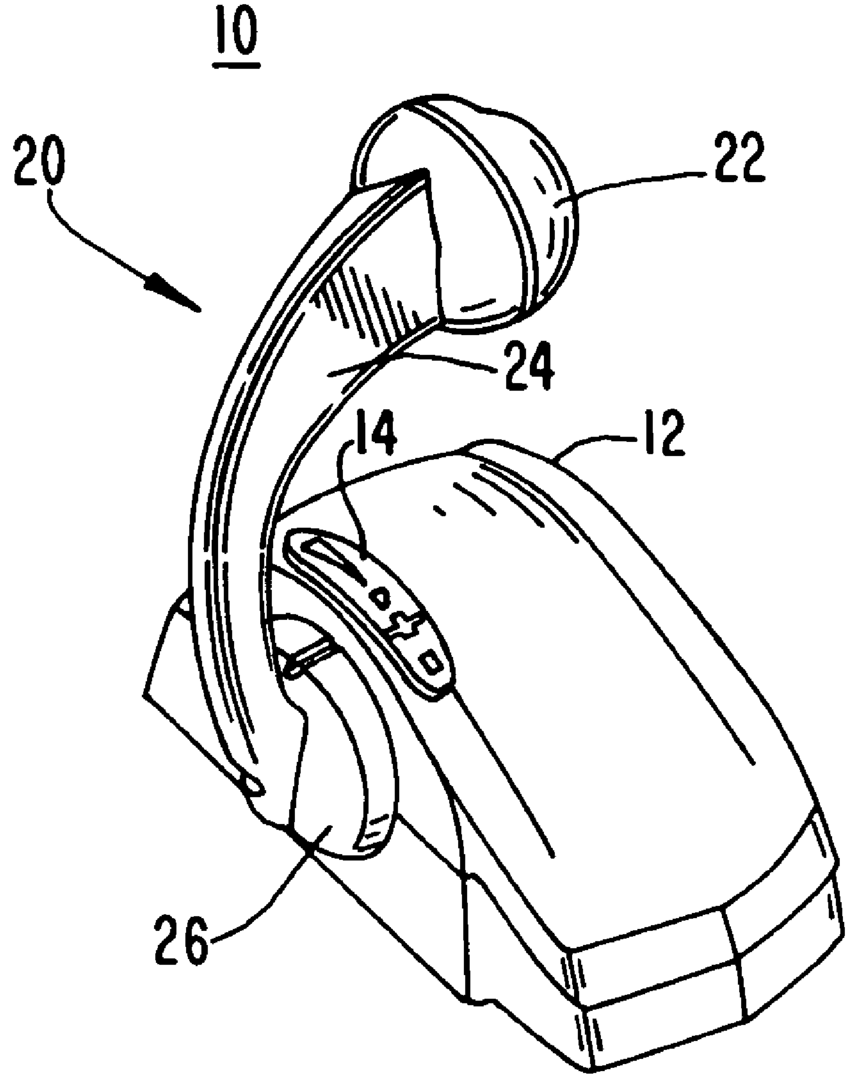
FIG. 1 (PRIOR ART)
FIG. 1 depicts a typical prior art single top mount control unit for controlling a marine vessel.
Figure 2C:
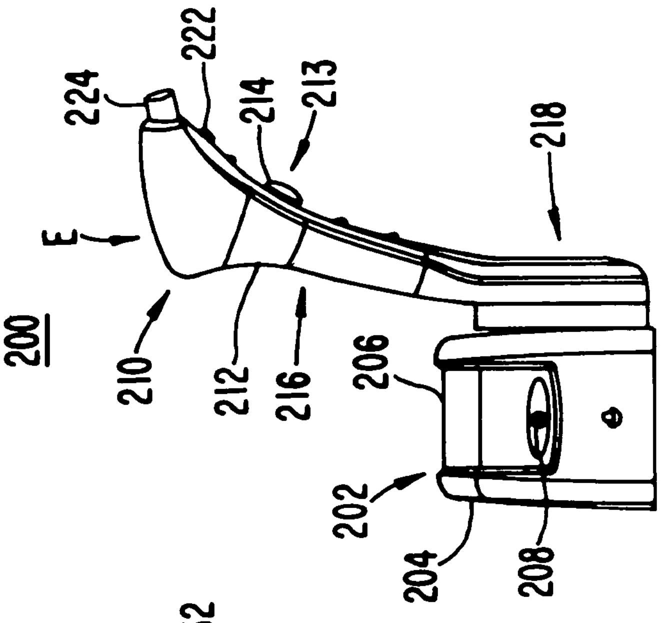
FIGS. 2A–2C are front, side, and rear views, respectively, of an embodiment of a top mount control unit according to the invention.
Figure 2B:
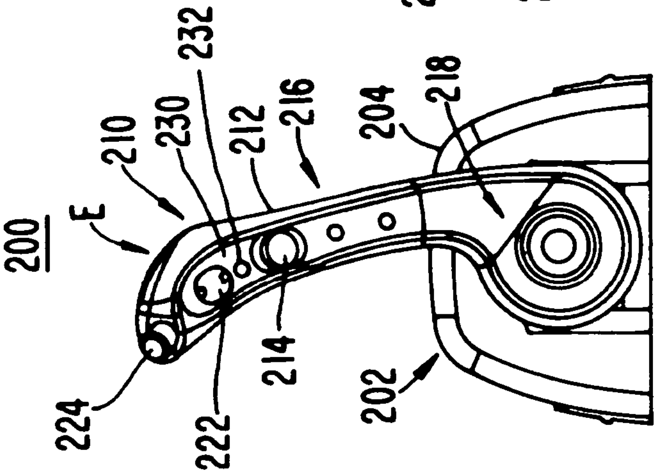
Figure 2A:
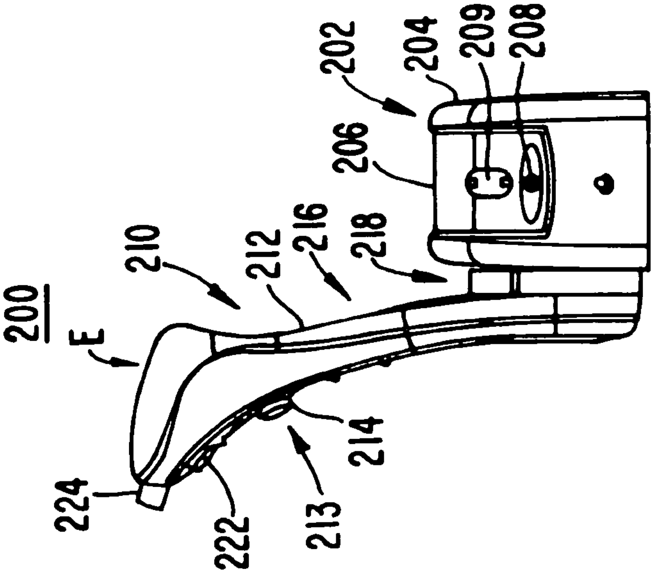

FIGS. 2A–2C are front, side, and rear views, respectively, of an embodiment of a top mount control unit 200 according to the invention. As shown, the control unit 200 includes a control head 202, and a hand lever 210 that is rotationally coupled to the control head 202. The control head 202 may include a cover 204. The cover 204 may include a cover insert 206, which may be secured to the cover via one or more screws 208. A tilt switch 209 is attached to cover 204, and extends through an opening in the cover insert 206.

The hand lever 210 may be used to control transmission shift position and engine throttle. According to the invention, the hand lever 210 includes a housing 212, and an integrated horn controller 213 that is adapted to be electrically connected to a horn (not shown). The horn controller 213 is coupled to the housing 212 and is accessible from the exterior of the housing 212. The hand lever 210 may include a handle portion 216 and a hub assembly 218. The hub assembly 218, and, thus, the hand lever 210, is rotationally coupled to the control head 202. For example, the hub assembly 218 may be coupled to a rotational mechanism (not shown) within the control head 202.

In an example embodiment, the horn controller 213 includes a button 214 that the operator can push to sound the horn. The horn controller 213 is attached to the housing 212 of the handle portion 216 of the hand lever 210. The hand lever 210 may also include an integrated trim switch 222, and a handle cover 230, which may be screwed into the handle portion 212 via one or more screws 232. The handle cover 230 includes openings through which the trim switch 222 and horn controller 213 extend.

An interlock release plunger 224 may be provided to enable the operator to release the hand lever 210 from a locked position to enable rotational movement of the hand lever 210 relative to the control head 202. The release plunger 224 may be coupled, via a cable and pawl system, for example, (not shown) to the rotational mechanism in the control head 202 such that, when the plunger 224 is pushed, the hand lever 210 is unlocked and rotational movement of the hand lever 210 is enabled. A detailed description of an example embodiment of such a cable and pawl system is provided in copending U.S. patent application Ser. No. 10/694,411 filed on Oct. 27, 2003 and entitled “Cable and Latch System for Controlling Rotational Movement of a Hand Lever”. The disclosure of U.S. patent application Ser. No. 10/694,411 is incorporated herein by reference in its entirety.

In an example embodiment as shown, the distal end E of the housing 212 has an overall shape that enables the distal end E to be received in the palm of a human hand. The horn controller 213 is coupled to the housing 212 such that the horn controller 213 is within reach of the thumb while the distal end E is received in the palm. Though it should be understood that the horn controller 213 may be located anywhere on the hand lever 210 without departing from the scope of the invention, it should also be understood that it may be desirable to locate the horn controller 213 so as to enable an operator to push the horn button 214 with his thumb without having to remove his hand from the hand lever 210. Thus, an operator may control the horn, shift, and throttle with one hand.

Further, though the embodiment depicted throughout this specification is a right handed embodiment (i.e., designed to be controlled using the right hand), it should be understood that a left handed embodiment may be provided. Also, though the embodiment shown depicts the hand lever attached to the left side of the control head, it should be understood that the hand lever could be attached to the right side of the control head or through the middle portion of the control head. Further, it should be understood that the specific configuration of the hand lever depicted in the figures was chosen for ornamental purposes and that other configurations could be used in alternative embodiments.

Figure 3A:
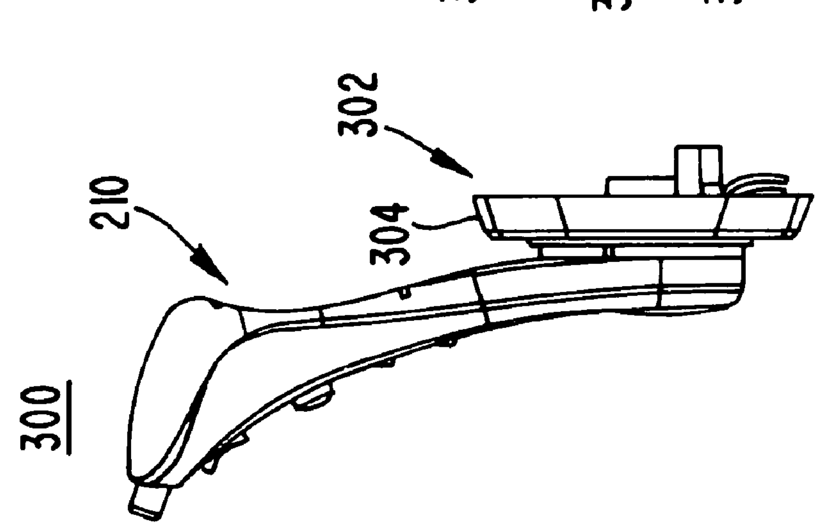
FIGS. 3A–3C are front, side, and rear views, respectively, of an embodiment of a side mount control unit according to the invention.
Figure 3B:
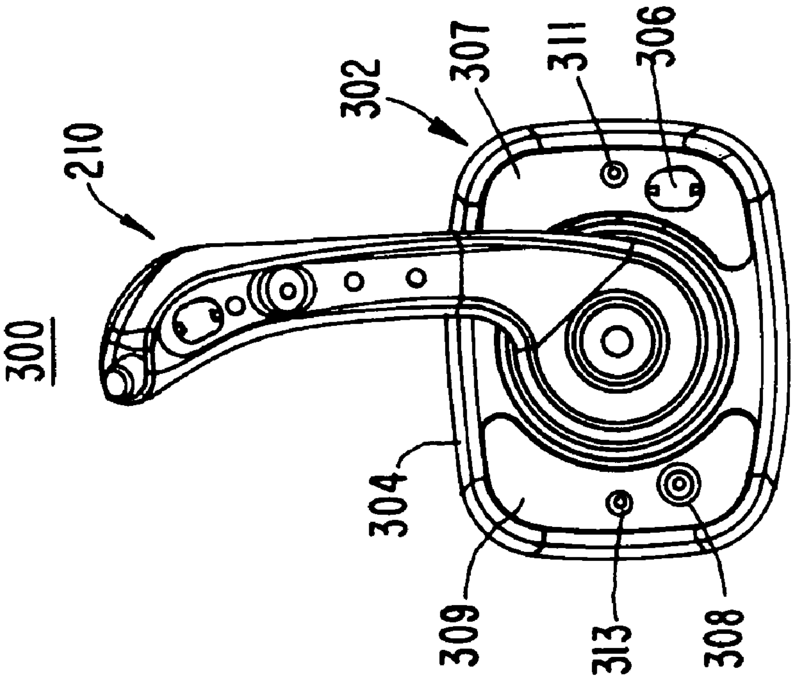
Figure 3C:
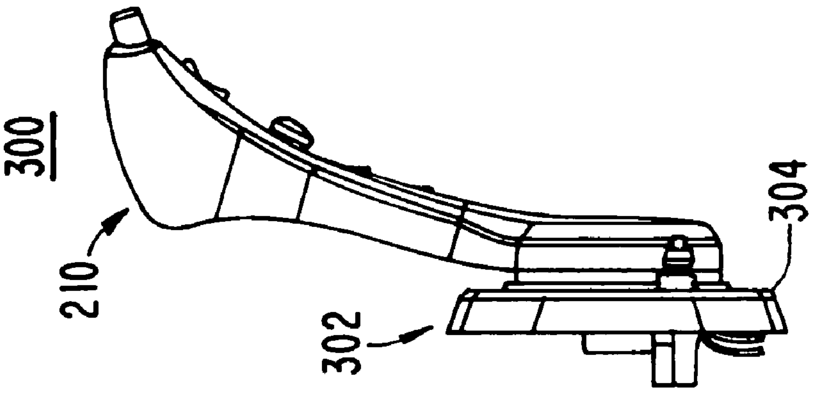

FIGS. 3A–3C are front, side, and rear views, respectively, of an embodiment of a side mount control unit 300 according to the invention. As shown, the control unit 300 includes a side mount control head 302. A hand lever 210, such as described above in connection with FIGS. 2A–2E, may be rotationally coupled to the control head 302.

The side mount control head 302 may include a side mount bezel 304. A trim switch 306 and an interrupt switch 308 extend through respective openings in the side mount bezel 304. A pair of inserts 307, 309 may be secured to the bezel 304 via screws 311, 313, for example. Each insert 307, 309 includes a respective opening through which the tilt switch 306 or interrupt switch 308, respectively, extends.

Figure 4:
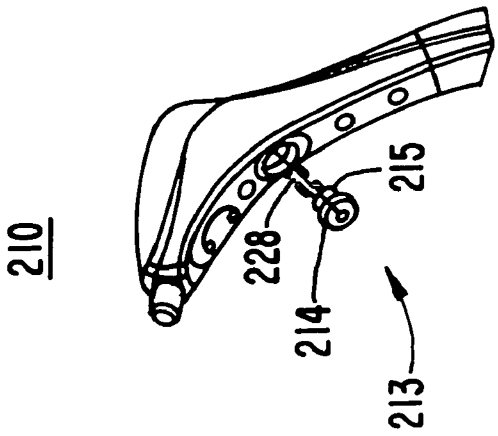
FIG. 4 is a partial exploded view of an embodiment of a hand lever according to the invention.

FIG. 4 is a partial exploded view of an embodiment of a hand lever 210 according to the invention. As shown, an example embodiment of a horn controller 213 may include a horn button 214 and electrically conductive wiring 228 that adapts the horn controller 213 to be electrically connected to the horn (not shown). The wiring 228 may be low voltage wiring, for example, though it should be understood that any desired wiring may be used.

The horn controller 213 extends through respective openings in the housing 212 and handle cover 230. In an example embodiment, the horn button 214 has a threaded portion 215 that extends through the openings and into the interior defined by the housing 212. A nut and washer combination (not shown) may be used to tighten the horn button 214 against the housing 212. Thus, the horn controller 213 may be attached to the housing 212 such that the horn controller 213 is accessible from the exterior of the housing 212.

Figure 5:
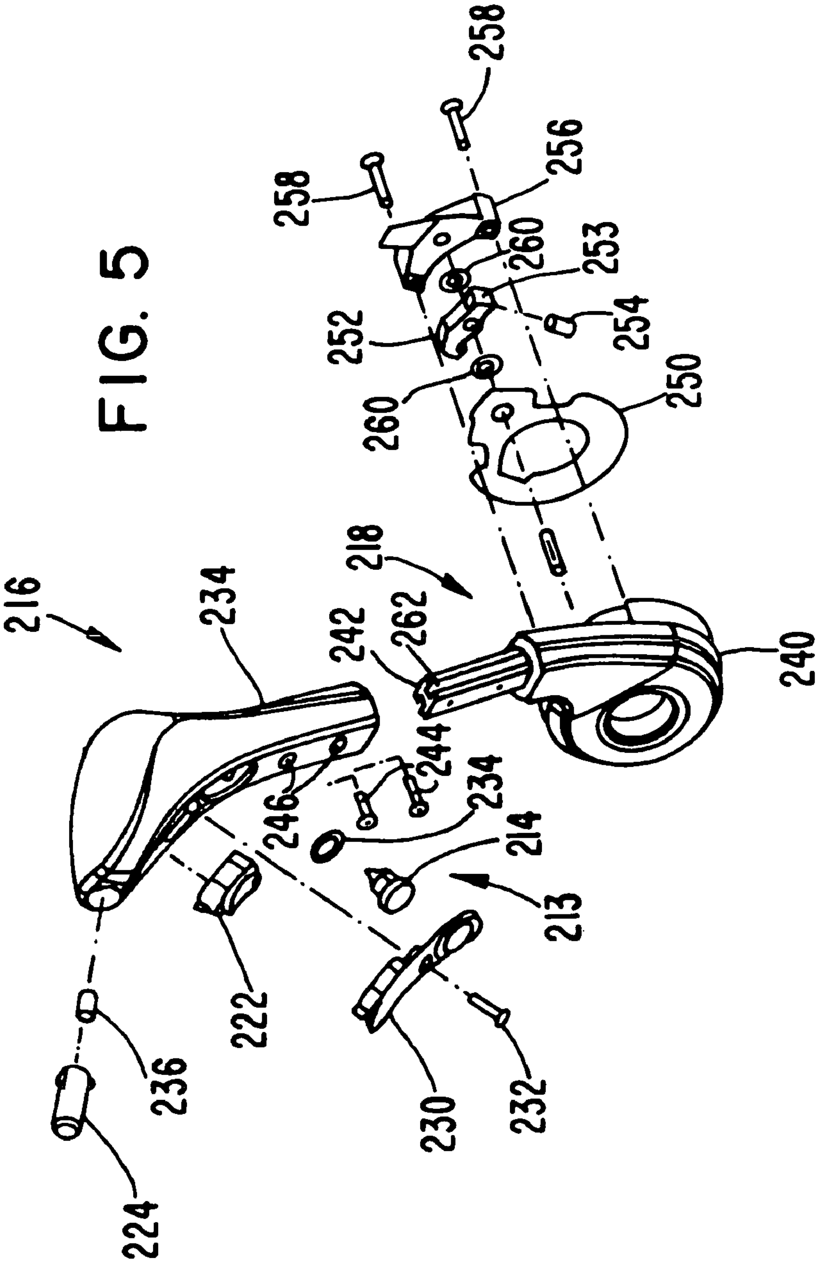
FIG. 5 is an exploded view of an embodiment of a hand lever according to the invention.

FIG. 5 is an exploded view of an embodiment of a hand lever 210 according to the invention. As shown, the hand lever 210 may include a handle portion 216 and a hub assembly 218. The handle portion 216 of the hand lever 210 includes a handle grip 234, which may be made of a rubber material and overmolded onto the handle housing 212, which may be made of a plastic material.

The horn button 214 may be secured to the handle housing 212 via a nut 234. The horn button may be a momentary switch, for example, and the nut may be a switch nut. The interlock plunger 224 and a compression pawl spring 236 are provided for unlocking the hand lever 210 to enable rotational movement of the hand lever 210. The cover 230 may be secured to the handle portion 216 via a screw 232. The trim switch 222 and horn controller 213 extend through respective openings in the cover 230.

The hub assembly 218 may include a hub portion 240 having a stem 242. The handle portion 216 is affixed to the stem 242 (and, thus, to the hub assembly 218) via screws 244, which may be screwed into receiving holes 246 in the stem 242. The stem 242 also includes a groove or wire tunnel 262 extending along a length thereof. The wire tunnel

262 serves as a conduit for the wiring 228 that extends through the interior of the housing 212. The hub assembly 218 may also include a wiring shield 250 that shields wiring 228 that extends within the interior of the hub assembly 218. The hub portion 240, including the stem 242, and the wiring shield 250 may be made of a zinc alloy.

The hub assembly 218 may also include an interlock latch 252 and compression pawl spring 254 that form part of a cable and pawl system for unlocking the rotational movement of the hand lever 210. An interlock cable (not shown) is attached to the interlock plunger 224, extends through the interior of the housing 212, and is attached to the latch 252 in a receiving bore 253. A hub cover 256, which may be made of a zinc alloy, is secured to the hub portion 240 via a pair of screws 258. Thus, the hub assembly 218 may be held together. Thrust washers 260 may be provided between the wiring shield 250, latch 252, and hub cover 256.

Figure 6:
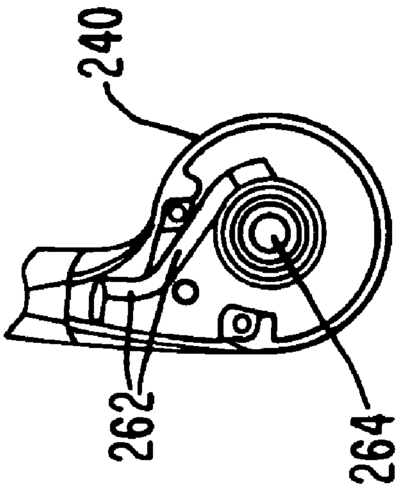
FIG. 6 depicts a wire tunnel within a handle hub as shown in FIG. 6.

FIG. 6 depicts the wire tunnel 262 as it extends into the interior of the hub portion 240. The wire tunnel 262 curves at least partially around the hub shaft 264. Wiring 228 may extend from the horn button 214 through the interior of the handle portion 216 into the wire tunnel 262. The wiring 228 may then coil at least partially around the hub shaft 264. The hub shaft 264 is adapted to rotationally couple the hand lever 210 to a hand lever support (such as one of the control heads described above). Coiling the wiring 228 around the hub shaft 264 is desirable because it accommodates the rotational movement of the hand lever 210.

Figure 7:
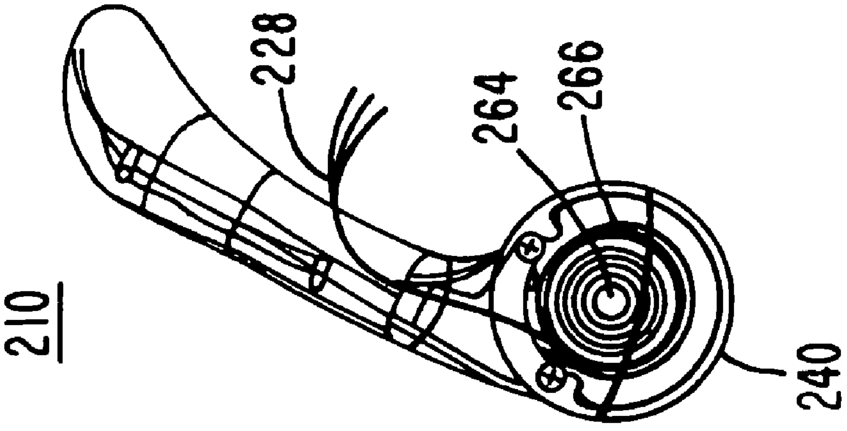
FIG. 7 depicts an example wiring scheme for a hand lever according to the invention.

FIG. 7 depicts an example wiring scheme for a hand lever 210 according to the invention. As shown, the wiring 228 is coiled around the hub shaft 264 approximately 2½ times. The wiring 228 may be affixed to the hub portion 240 of the housing 212 using a tape, for example, at a fixation point 266. The wiring 228 extends from the horn button 214 through the interior of the housing 212 through the wire tunnel 262 and around the hub shaft 264. Wiring for the trim switch 222 may also be provided along this path. The wiring 228 extends through respective slots in the wiring shield 250, interlock latch 252, and hub cover 256.

Figure 9:
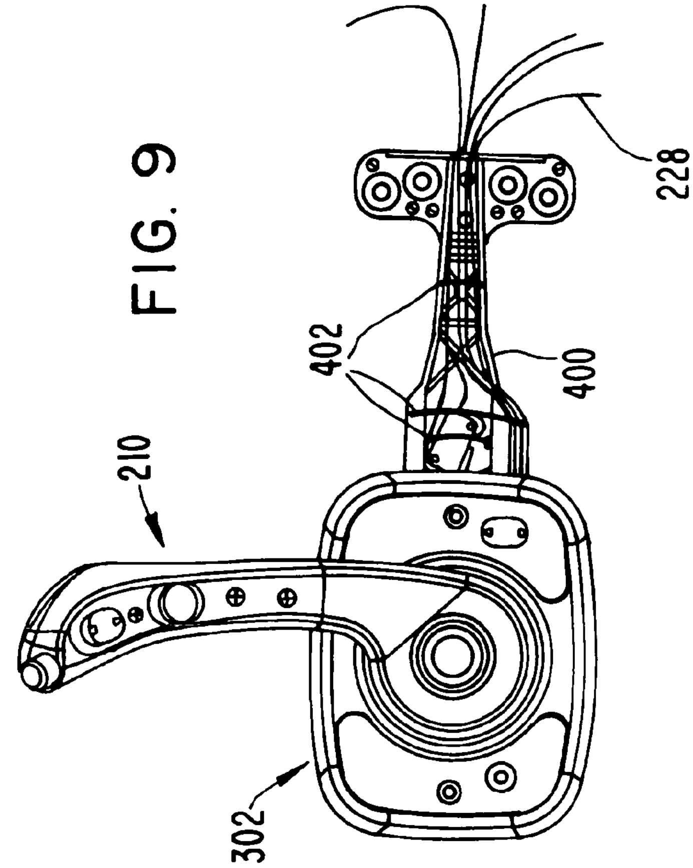
FIG. 9 depicts an example wiring scheme for an embodiment of a side mount control assembly according to the invention.
Figure 8:
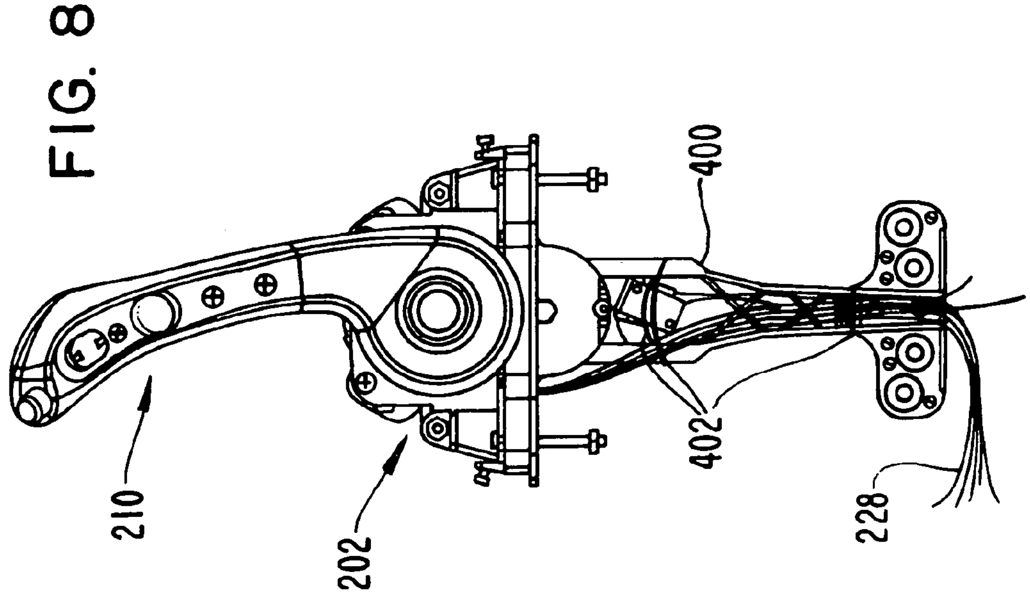
FIG. 8 depicts an example wiring scheme for an embodiment of a top mount control assembly according to the invention.

FIGS. 8 and 9 depict example wiring schemes for embodiments of top and side mount control assemblies, respectively. As shown, the wiring 228 extends out of the hand lever 210 and through the control head 202, 302. The wiring 228 extends out of the control head 202, 302 and along a mechanism assembly 400. The wiring 228 may be secured to the mechanism assembly 400 at one or more locations via cable ties 402, which may be Ty-wrap cable ties, for example.

The wiring 228 may terminate in any fashion that enables the wiring 228 to be electrically connected to the horn. For example, if the wiring from the horn terminates in a connector, the wiring from the horn controller may terminate in a complementary connector. Alternatively, the wiring from the horn controller could terminate at one or more eyelets. Alternatively, the horn controller could be wired to a microprocessor for electronic control of a horn or any other device that may be controlled electronically.

It is also contemplated that the controller 213 could be a speed controller that may be integrated into the hand lever using the principles of the invention described above. Such a speed controller may be electrically coupled to an electronic engine, for example, and may be used to provide speed or cruise control by controlling engine speed. Pushing the button 214 as described above could thus enable or disable cruise control. For example, if the button is pushed a first time, cruise control could be enabled. If the button is pushed a second time, then cruise control could be disabled.

It is to be understood, therefore, that the foregoing illustrative embodiments have been provided merely for the purpose of explanation and are in no way to be construed as limiting of the invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

What is claimed:

1. A hand lever comprising:

a housing having an exterior; and a horn controller that is adapted to be electrically connected to a horn, wherein the horn controller is coupled to the housing and is accessible from the exterior of the housing, and wherein the hand lever is adapted to control at least one of transmission shift position and engine throttle.

2. The hand lever of claim 1, wherein the horn controller includes electrically conductive wiring that adapts the horn controller to be electrically connected to the horn.

3. The hand lever of claim 2, wherein the housing defines an interior, and wherein the wiring extends through the interior of the housing.

4. The hand lever of claim 3, wherein the wiring extends through a wire tunnel in the interior of the housing.

5. The hand lever of claim 2, further comprising a hub shaft for rotationally coupling the hand lever to a hand lever support, and wherein the wiring is wrapped around the hub shaft.

6. The hand lever of claim 1, wherein the horn controller includes a button.

7. The hand lever of claim 1, wherein the horn controller is attached to the housing.

8. The hand lever of claim 1, wherein the housing has a distal end having an overall shape that enables the distal end to be received in the palm of a human hand, and wherein the horn controller is coupled to the housing such that the horn controller is within reach of the thumb of the human hand while the distal end of the housing is received in the palm.

9. A hand lever comprising:

a housing having an exterior; and a horn controller that is adapted to be electrically connected to a horn, wherein the housing has a distal end having an overall shape that enables the distal end to be received in a palm of a human hand having a thumb, wherein the horn controller is coupled to the housing such that the horn controller is within reach of the thumb while the distal end of the housing is received in the palm, and wherein the hand lever is adapted to control at least one of transmission shift position and engine throttle.

10. A control assembly, comprising:

a control head; and a hand lever rotationally coupled to the control head, the hand lever comprising a housing having an exterior; and a horn controller that is adapted to be electrically connected to a horn, wherein the horn controller is coupled to the housing and is accessible from the exterior of the housing, and wherein the hand lever is adapted to control at least one of transmission shift position and engine throttle.

11. The control assembly of claim 10, wherein the control assembly is a top mount control assembly.

12. The control assembly of claim 10, wherein the control assembly is a side mount control assembly.

13. A control assembly, comprising:

a control head; and a hand lever rotationally coupled to the control head, the hand lever comprising a housing having an exterior; and a horn controller that is adapted to be electrically connected to a horn, wherein the housing has a distal end having an overall shape that enables the distal end to be received in a palm of a human hand having a thumb, wherein the horn controller is coupled to the housing such that the horn controller is within reach of the thumb while the distal end of the housing is received in the palm, and wherein the hand lever is adapted to control at least one of transmission shift position and engine throttle.

14. The control assembly of claim 13, wherein the control assembly is a top mount control assembly.

15. The control assembly of claim 13, wherein the control assembly is a side mount control assembly.

16. A hand lever comprising:

a housing having an extractor; and a speed controller that is adapted to be electrically coupled to an electronic engine to control a speed of the engine;

wherein the speed controller is coupled to the housing and is accessible from the exterior of the housing, and wherein the hand lever is adapted to control at least one of transmission shift position and engine throttle, wherein the speed controller includes electrically conductive wiring that adapts the speed controller to be electrically connected to the engine, futher comprising a hub shaft for rotationally coupling the hand lever to a hand lever support, and wherein the wiring is wrapped around the hub shaft.

17. The hand lever of claim 16, wherein the housing defines an interior, and wherein the wiring extends through the interior of the housing.

18. The hand lever of claim 16, wherein the wiring extends through a wire tunnel in the interior of the housing.

19. The hand lever of claim 16, wherein the speed controller includes a button.

20. The hand lever of claim 16, wherein the speed controller is attached to the housing.

21. The hand lever of claim 16, wherein the housing has a distal end having an overall shape that enables the distal end to be received in the palm of a human hand, and wherein the speed controller is coupled to the housing such that the speed controller is within reach of the thumb of the human hand while the distal end of the housing is received in the palm.

22. The hand lever of claim 16, wherein the speed controller is adapted to provide cruise control.

* * * * *

UNITED STATES PATENT AND TRADEMARK OFFICE

CERTIFICATE OF CORRECTION

PATENT NO. : 6,979,278 B2
DATED : December 27, 2005
INVENTOR(S) : Sean E. Rick et al.

It is certified that error appears in the above-identified patent and that said Letters Patent is hereby corrected as shown below:

Title page,
Item [56], References Cited, U.S. PATENT DOCUMENTS, delete "5,657,001 A, 08/1997, Wilson, 74/473.12" and insert -- 5,957,001 A, 09/1999, Gualtieri et al., 74/473.12 --.

Signed and Sealed this

Twenty-first Day of March, 2006

JON W. DUDAS
*Director of the United States Patent and Trademark Office*